United States Patent
Kavousian

(10) Patent No.: US 10,361,630 B1
(45) Date of Patent: Jul. 23, 2019

(54) SYSTEMS AND METHODS FOR A RECONFIGURABLE SWITCHED CAPACITOR DC-DC CONVERTER

(71) Applicant: Verily Life Sciences LLC, South San Francisco, CA (US)

(72) Inventor: Amirpouya Kavousian, San Jose, CA (US)

(73) Assignee: VERILY LIFE SCIENCES LLC, South San Francisco, CA (US)

(*) Notice: Subject to any disclaimer, the term of this patent is extended or adjusted under 35 U.S.C. 154(b) by 0 days.

(21) Appl. No.: 15/850,810

(22) Filed: Dec. 21, 2017

Related U.S. Application Data

(60) Provisional application No. 62/438,475, filed on Dec. 23, 2016.

(51) Int. Cl.
| | | |
|---|---|---|
| *H02M 3/158* | (2006.01) | |
| *H02J 7/00* | (2006.01) | |
| *H02M 3/07* | (2006.01) | |
| *G05F 1/46* | (2006.01) | |

(52) U.S. Cl.
CPC .......... *H02M 3/1582* (2013.01); *G05F 1/46* (2013.01); *H02J 7/0019* (2013.01); *H02M 3/07* (2013.01)

(58) Field of Classification Search
CPC ........ H02M 3/07; H02M 3/135; H02M 3/145; H02M 3/155; H02M 3/157; H02M 3/158; H02M 3/1582; H02J 7/0019; G05F 1/46
See application file for complete search history.

(56) References Cited

U.S. PATENT DOCUMENTS

| | | | | |
|---|---|---|---|---|
| 9,318,974 | B2 * | 4/2016 | Yoscovich | H02M 7/537 |
| 9,667,139 | B2 * | 5/2017 | Giuliano | H02M 3/07 |
| 9,812,954 | B1 * | 11/2017 | Kose | H02M 3/07 |
| 9,941,813 | B2 * | 4/2018 | Yoscovich | H02M 7/42 |
| 2009/0072800 | A1 * | 3/2009 | Ramadass | H02M 3/07 323/271 |
| 2013/0106375 | A1 | 5/2013 | Marsili et al. | |
| 2015/0207401 | A1 | 7/2015 | Zhang et al. | |
| 2018/0026526 | A1 * | 1/2018 | Ahmed | H02M 3/07 323/271 |
| 2018/0034363 | A1 * | 2/2018 | Giuliano | H02M 3/07 |
| 2018/0124529 | A1 * | 5/2018 | Larsen | H02M 3/07 |

* cited by examiner

*Primary Examiner* — Adolf D Berhane
(74) *Attorney, Agent, or Firm* — Kilpatrick Townsend & Stockton LLP

(57) ABSTRACT

Systems and methods for a reconfigurable DC-DC converter are disclosed. In one embodiment, a system includes: a capacitor; a first switch circuit electrically coupled in parallel to the capacitor; a second switch circuit electrically coupled in parallel to the capacitor; and a control circuit electrically coupled to the first switch circuit and the second switch circuit to switch the switch circuits at one of at least two different frequencies to convert an input voltage to an output voltage, wherein the control circuit controls the first switch circuit and second switch circuit to operate in a plurality of modes to output a desired current range.

17 Claims, 6 Drawing Sheets

SYSTEMS AND METHODS FOR A RECONFIGURABLE SWITCHED CAPACITOR DC-DC CONVERTER

CROSS-REFERENCE TO RELATED APPLICATIONS

The present application claims priority to Provisional Application No. 62/438,475, filed on Dec. 23, 2016, and entitled "Systems and Methods for a Reconfigurable Switched Capacitor DC-DC Converter," the entirety of which is hereby incorporated by reference herein.

BACKGROUND

Many modern electronic devices are powered by batteries that provide a voltage different than the voltage required by internal circuitry. Thus, a DC-DC converter is necessary. However, many DC-DC converters have a high energy loss or take a up a comparatively large amount of space.

SUMMARY

In one embodiment, a system of the present disclosure may comprise: a capacitor; a first switch circuit electrically coupled in parallel to the capacitor; a second switch circuit electrically coupled in parallel to the capacitor; and a control circuit electrically coupled to the first switch circuit and the second switch circuit to switch the switch circuits at one of at least two different frequencies to convert an input voltage to an output voltage, wherein the control circuit controls the first switch circuit and second switch circuit to operate in a plurality of modes to output a desired current range.

In one embodiment, a method according to the present disclosure may comprise: providing a capacitor; coupling a first switch circuit to the capacitor; coupling a second switch circuit to the capacitor; and coupling a control circuit to the first switch circuit and the second switch circuit to switch the switch circuits at one of at least two different frequencies to convert an input voltage to an output voltage, wherein the control circuit controls the first switch circuit and second switch circuit to operate in a plurality of modes to output a desired current range.

In another embodiment, a method according to the present disclosure may comprise: determining a power level required by a load; and controlling a DC-DC converter to operate in a mode to provide the power to the load, wherein the DC-DC converter comprises: a capacitor; a first switch circuit electrically coupled to the capacitor; a second switch circuit electrically coupled to the capacitor; and a control circuit electrically coupled to the first switch circuit and the second switch circuit at one of at least two different frequencies, wherein the control circuit controls the first switch circuit and second switch circuit to operate in a plurality of modes to output a desired current range.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

A full and enabling disclosure is set forth more particularly in the remainder of the specification. The specification makes reference to the following appended figures.

DETAILED DESCRIPTION

Figure 1A:
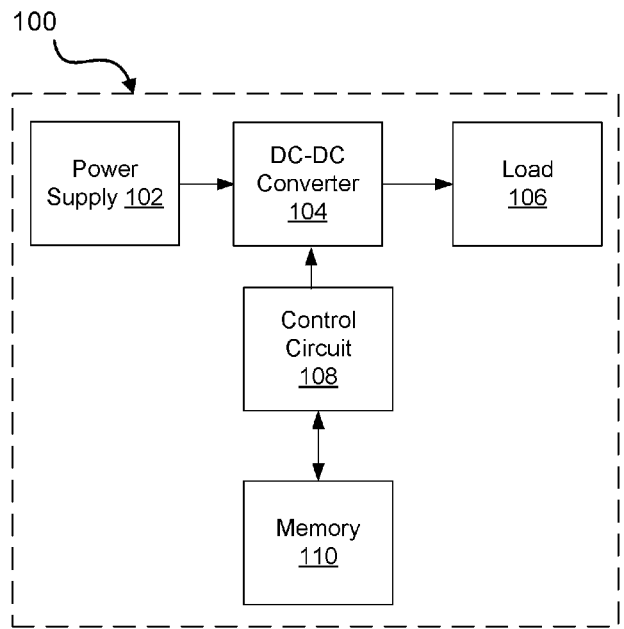
FIG. 1A shows an illustrative system for a reconfigurable DC-DC converter.

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used in another embodiment to yield a still further embodiment. Thus, it is intended that this disclosure include modifications and variations as come within the scope of the appended claims and their equivalents.

Illustrative Example of a Reconfigurable DC-DC Converter

Some electronic devices require a large range of supply voltages and/or currents, but have access to only a single power source (e.g., a battery). Further, some electronic devices have only limited space available for a power supply circuit. Embodiments of the present disclosure solve this problem with a single integrated circuit chip comprising multiple operating modes and a reduced number of transistors and capacitors, e.g., some embodiments may require only one capacitor.

One illustrative embodiment of the present disclosure comprises a DC-DC converter for use in a mobile system. Such a mobile system may comprise a battery configured to provide power at a voltage that is different than the voltage required by one or more loads in the system. For example, in one such embodiment, the system may comprise a wearable device (e.g., a smartwatch) or a wearable medical device (e.g., a patch for monitoring an analyte, e.g., a Continuous Glucose Monitor (CGM)). One of the loads in the system may comprise a Bluetooth interface, e.g., a Bluetooth Low Energy (BLE) interface. Such an interface may operate at a plurality of different load ranges or levels, e.g., off (when off), low power (when in standby), medium power (when waiting to transmit), and high power (when transmitting). Embodiments of the present disclosure provide a controllable DC-DC converter that can be configured to operate in different modes to efficiently provide a power level or range of power levels to the load in each of these modes.

In this illustrative embodiment, the DC-DC converter can include one or more single phase circuits corresponding to one or more phase shifts that can be combined into a DC signal. Each single phase circuit comprises a capacitor electrically coupled to and shared amongst a first switch circuit and a second switch circuit, each of which is electrically coupled to the same power supply (e.g., a battery) and the same load (e.g., a BLE interface). In the illustrative embodiment, the switch circuits are controlled by a controller circuit (e.g., a processor). Each switch circuit comprises an array of transistors (e.g., CMOS such as one or more of a P-Channel MOSFETS (PMOS) or N-Channel MOSFETS (NMOS)), which are oscillated by a clock signal provided by the controller circuit. The switch circuits are thereby configured to oscillate between providing a charge to the capacitor and allowing the capacitor to discharge. In one embodiment the capacitor acts as a "flying capacitor" or as a "charge pump." This configuration may be used to provide a voltage that is either higher or lower than the voltage provided by the power source.

In this illustrative embodiment, the first switch circuit comprises large transistors and the second switch circuit comprises small transistors (e.g., transistors that are approximately half the size of the transistors in the first switch circuit, e.g., transistors that have a higher resistance when in the closed state). In the illustrative embodiment, the controller is configured to determine a power level (e.g., a desired current and/or voltage) to provide to the load and control the switching circuits to provide that power level. For example, in one embodiment, when operating in a high power mode, the control circuit is configured to provide a high frequency signal (e.g., a signal greater than 1 MHz, such as a 10 MHz signal) to the first switch circuit and turn off the second switch circuit. Such a mode may provide a voltage at a high current (e.g., 5 mA). Other modes operate one or more of the switch circuits at varying frequencies to provide higher or lower power levels or ranges of power to the load. Still other modes may bypass one or more of the switch circuits. Additional modes to provide power at various ranges or levels are described with regard to the operating modes discussed in Table 1 below.

In some embodiments, the switching circuits in one single phase circuit may be interleaved (e.g., connected in series or parallel) with one or more other single phase circuits, each of which operate at the same frequency, but at a different phase. The higher the number of different phase circuits connected to each other, the less voltage ripple there is at the power signal provided to the load. For example, in one embodiment eight first switching circuits and eight second switching circuits may be interleaved in parallel with the capacitor. In such an embodiment, when active, each single phase circuit may be operated at the same frequency that is 45 degrees out of phase (360 degrees/8) with respect to the other single phase circuits. However, other numbers of switching circuits may be employed and configured to operate at different phase differences based on dividing 360 degrees by the number of switching circuits.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

Illustrative Systems for a Reconfigurable DC-DC Converter

FIG. 1A shows an illustrative system 100 for a reconfigurable DC-DC converter according to one embodiment of the present disclosure. In some embodiments, system 100 may comprise one or more of a: mobile device (cellular phone, smartphone, tablet, etc.), wearable device (e.g., fitness tracker, smart watch, etc.), health monitor (e.g., analyte sensor, Continuous Glucose Monitor (CGM), blood pressure sensor, etc.) laptop, desktop, gaming system, controller for a gaming system, or in a transmitter module to be used in any type of portable device, or in some other device known in the art.

As shown in FIG. 1A, the system 100 comprises a power supply 102, a DC-DC converter 104, a load 106, a control circuit 108, and a memory 110. Power supply 102 comprises a current and/or voltage source such as a battery. Load 106 comprises a circuit that requires voltage and current to operate. For example, the load 106 can be a radiofrequency or other wireless communication circuit. In one example, the load 106 comprises a Bluetooth interface. In one example, the load 106 comprises a transmission-only communication circuit.

DC-DC converter 104 comprises a capacitor electrically coupled to a plurality of switching circuits (e.g., one or more first switching circuits and one or more second switching circuits). Each switch circuit comprises an array of transistors, which are oscillated (e.g., toggled between an on or closed circuit state and off or open circuit state) by a clock signal provided by the controller circuit. The switch circuits are configured to oscillate between providing a charge to the capacitor and allowing the capacitor to discharge. This mode may be used to provide a voltage that is either higher or lower than the voltage provided by the power source.

The DC-DC converter 104 is controlled by control circuit 108. For example, control circuit 108 may determine a power level (e.g., a voltage and/or current value) to provide to load 106. Based on this determination, control circuit 108 may operate one or more switching circuits at various frequencies to provide power to the load 106. Control circuit 108 may include without limitation one or more general-purpose processors, one or more special-purpose processors (such as digital signal processing (DSP) chips, graphics acceleration processors, application specific integrated circuits (ASICs), and/or the like), and/or other processing structures or means, which can be configured to perform one or more of the methods described herein.

The control circuit 108 is electrically coupled to memory 110, which may comprise program code configured to be executed by control circuit 108 to perform operations described herein. Further, memory 110 may comprise storage for control circuit 108 to store data. In some embodiments, memory 110 may comprise local and/or network accessible storage, and/or can include, without limitation, a disk drive, a drive array, an optical storage device, a solid-state storage device, such as a random access memory (RAM), and/or a read-only memory (ROM), which can be programmable, flash-updateable and/or the like. Such storage devices may be configured to implement any appropriate data stores, including without limitation, various file systems, database structures, and/or the like.

Figure 1B:
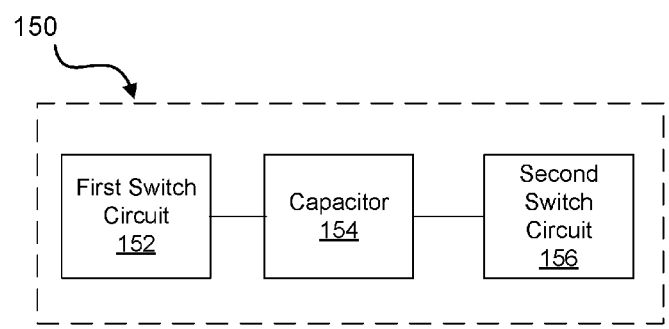
FIG. 1B shows an illustrative system for a reconfigurable DC-DC converter.

Turning now to FIG. 1B, which shows another embodiment of a system 150 for a reconfigurable DC-DC converter according to the present disclosure. As shown in FIG. 1B, the system 150 comprises a first switch circuit 152, a capacitor 154, and a second switch circuit 156. The capacitor 154 comprises one or more devices to store electric charge. For example, capacitor 154 may comprise one or more pairs of conductors separated by an insulator. Further, capacitor 154 may comprise a plurality of capacitors connected in parallel to increase total capacitance.

In the embodiment shown in FIG. 1B, each of the first switch circuit 152 and the second switch circuit 156 comprises an array of transistors (e.g., PMOS or NMOS transistors), which are oscillated (e.g., switched on and off) by a clock signal provided by a controller circuit (e.g., control circuit 108 described above). The switch circuits 152 and 156 are configured to oscillate between providing a charge to the capacitor 154 and allowing the capacitor 154 to discharge. This mode may be used to provide a voltage to a load (e.g., load 106) from the capacitor 154 that is either higher or lower than the voltage provided by a power source (e.g., power supply 102).

Figure 2:
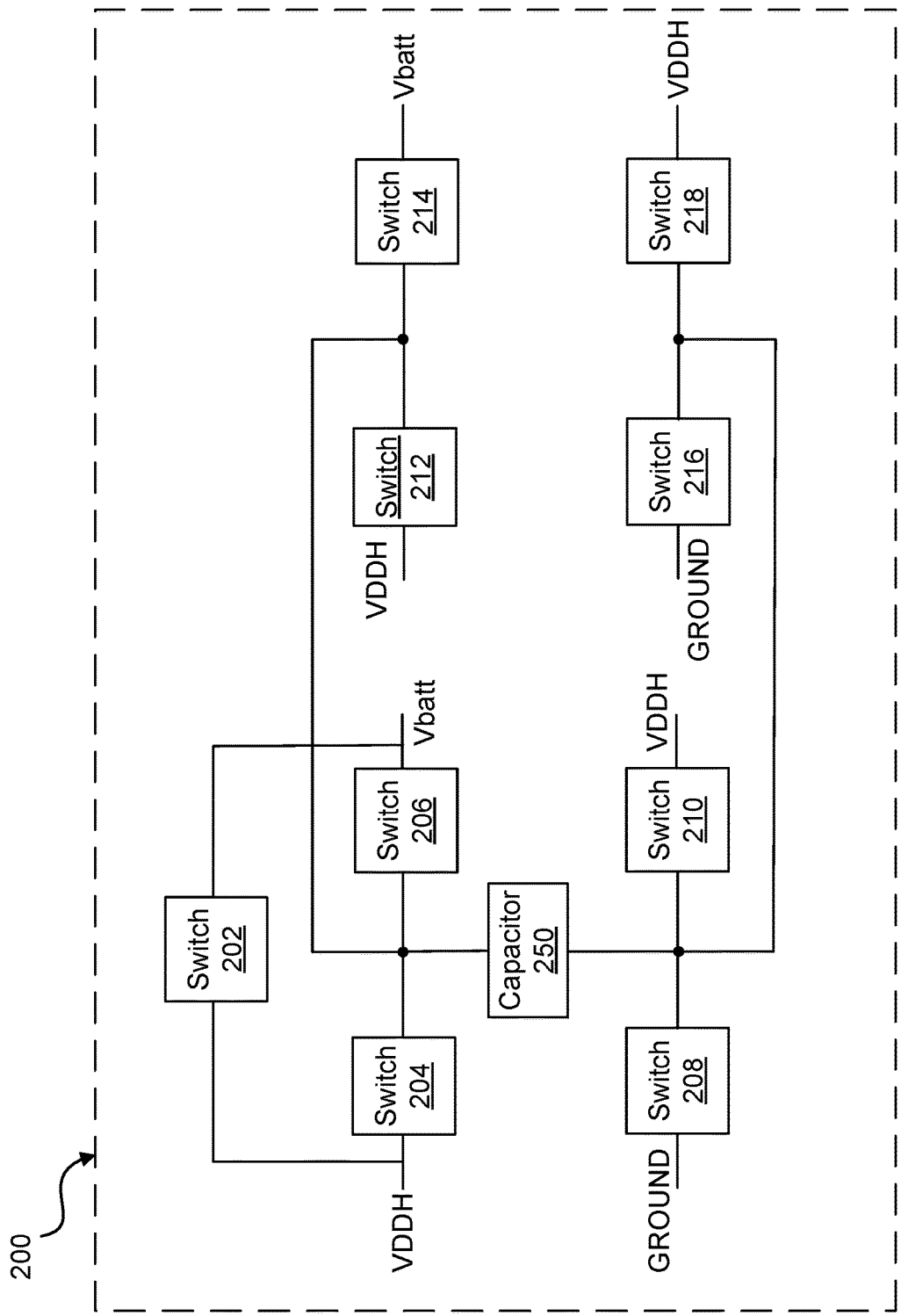
FIG. 2 shows an illustrative system for a reconfigurable DC-DC converter.

Turning now to FIG. 2, which shows another embodiment of a system 200 for a reconfigurable DC-DC converter. The system 200 comprises one embodiment of the DC-DC converter 104 described above. As shown in FIG. 2, the system 200 comprises a capacitor 250, a bypass switch 202, a first switching circuit (switches 204, 206, 208, and 210), and a second switching circuit (switches 212, 214, 216, and 218). In the embodiment shown in FIG. 2, each of the first and second switching circuits are shown connected to a power supply (shown as Vbatt), a load (shown as VDDH), and Ground (shown as GROUND).

In the embodiment shown in FIG. 2, the bypass switch 202 provides a bypass around the switching circuits. Thus, when bypass switch 202 is active the load is connected directly to the power supply, without relying on the DC-DC converter. In such an embodiment, switches 206 and 208 may be active to electrically couple the capacitor 250 in parallel with the load, providing AC-coupling.

In the embodiment shown in FIG. 2, each of the switches of the first switching circuit (switches 204, 206, 208, and 210) are larger than the switches of the second switching circuit (switches 212, 214, 216, and 218). For example, the switches in the first switching circuit may comprise double the width of the switches of the second switching circuit (e.g., lower resistance than the second switching circuit). Each of the switches comprise an array of transistors, e.g., BJTs or MOSFETS. In one embodiment, each of switches 204, 206, 212, and 214 comprises a P-Channel MOSFET (PMOS) and each of switches 208, 210, 216, and 218 comprises an N-Channel MOSFET (NMOS).

In one embodiment, each of the switches in system 200 is controlled by a controller circuit (e.g., control circuit 108 described above). In one embodiment, the processor determines a required load and controls each of the switches to provide the required load. In one embodiment the required load may be provided by one of a plurality of configurations or modes, e.g., based on pre-configured operating modes and corresponding voltage or current requirements.

In a first mode, off mode, the control circuit determines that zero voltage or current is required and turns off the DC-DC Converter by turning off one or more of the switches 204-218 to electrically couple the capacitor 250 as a bypass capacitor for example, in one embodiment, switches 210 and 218 may be turned off. In another embodiment additional switches may be turned off or oscillated to operate the capacitor 250 in bypass mode.

In a second mode, bypass mode, the control circuit determines that no voltage conversion is required and activates switch 202 to bypass the DC-DC converter and provide power directly from VDDH to Vbatt. In such an embodiment, the processor may deactivate all the other switches in the circuit.

In a third mode, low power mode, which may be useful for standby operations, e.g., standby operations for a Bluetooth interface, the control circuit turns off each of the switches of the first switching circuit (switches 204, 206, 208, and 210). Further, in such a mode the control circuit provides a control signal of a first frequency to each of the switches of the second switching circuit (switches 212, 214, 216, and 218). This first frequency may comprise, e.g., 50 KHz. Further, the control signals provided to switches 212 and 216 are out of phase with the control signals provided to switches 214 and 218. For example, the control signal may be 180 degrees out of phase to allow the capacitor 250 to discharge or charge on each oscillation.

In a fourth mode, mid-power, which the control circuit may use when a device is active but not transmitting, the control circuit turns off each of the switches of the second switching circuit (switches 212, 214, 216, and 218). Further, in such a mode the control circuit provides a control signal of a first frequency to each of the switches of the first switching circuit (switches 204, 206, 208, and 210). This first frequency may comprise, e.g., 50 KHz. Further, the control signals provided to switches 204 and 208 are out of phase with the control signal provided to switches 206 and 210. For example, the control signals may be 180 degrees out of phase with each other to allow the capacitor 250 to discharge or charge on each oscillation.

In a fifth mode, high-power, which is used by the control circuit when the device is transmitting, the control circuit turns off each of the switches of the second switching circuit (switches 212, 214, 216, and 218). Further, in such a mode the control circuit provides a control signal of a second frequency to each of the switches of the first switching circuit (switches 204, 206, 208, and 210). This second frequency may comprise a much higher frequency than the first frequency, e.g., 10 MHz. Further, the control signal provided to switches 204 and 208 are out of phase with the control signal provided to switches 206 and 210. For example, the control signals may be 180 degrees out of phase with each other to allow the capacitor 250 to discharge or charge on each oscillation.

In each of the modes describes above the control circuit may further control a plurality of interleaved switching circuits, each operating as described above and at the same frequency but at a phase difference to reduce the voltage ripple. In other embodiments, the interleaved switching circuits are active only in the high power mode. Further, in some embodiments, a plurality of capacitors 250 may be connected in parallel to increase the total capacitance.

Additional details associated with each of the modes described above is shown below in Table 1.

TABLE 1

Example Operating Modes According to One Embodiment

| Mode | Function |
| --- | --- |
| OFF (Reset) mode | Iload = 0 DC-DC is off (Vout = undef) |
| Bypass Mode (Startup and OTP R/W and cases where Vin < 2.8 V) | DC-DC bypassed Vout = Vbatt |
| Low-Power Mode (for standby) | Iload = 500 nA (Vout = Vbatt/2 − 50 mV) |
| Mid-Power Mode | Iload = 10 uA (Vout = Vbatt/2 − 200 mV) |
| High-Power Mode (e.g., for transmitting) | Iload = 5 mA (Vout = Vbatt/2 − 200 mV) |

Figure 3:
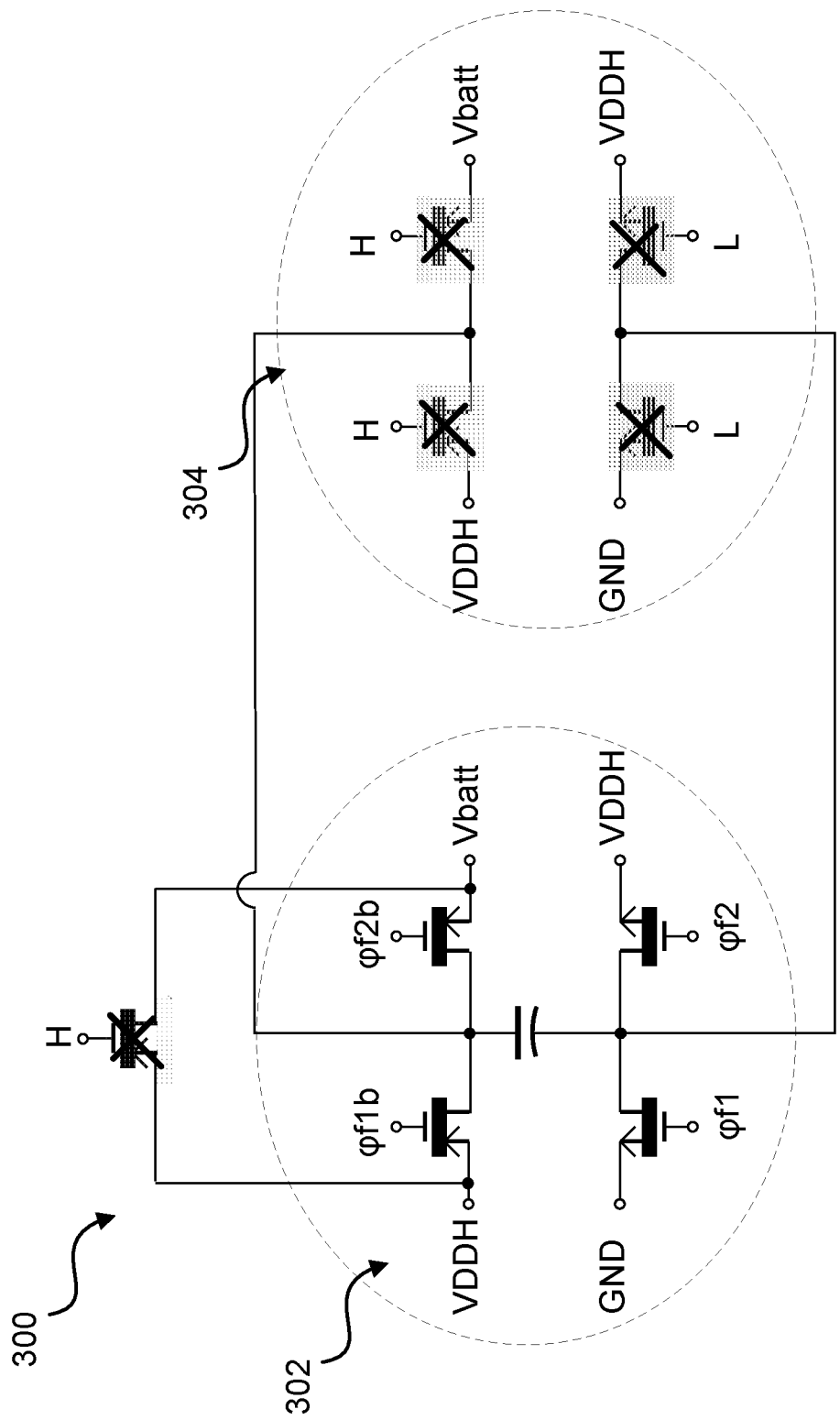
FIG. 3 shows another illustrative system for a reconfigurable DC-DC converter.

Turning now to FIG. 3, which shows another embodiment of a system 300 for a reconfigurable DC-DC converter. In the embodiment shown in FIG. 3, each of the switches comprises a MOSFET, e.g., a P-MOS or an N-MOS transistor. As shown in FIG. 3, the system 300 comprises a first switching circuit 302 and a second switching circuit 304. Further, as is shown in FIG. 3, the DC-DC converter is operating at either a high-power mode or a mid-power mode. This is indicated by the switches in the first switching circuit 302, which are active, whereas the switches in the second switching circuit 304 are inactive. Further, in the embodiment shown, the switches to the left of the capacitor are operated 180 degrees out of phase from the switches to the right of the capacitor.

Figure 4:
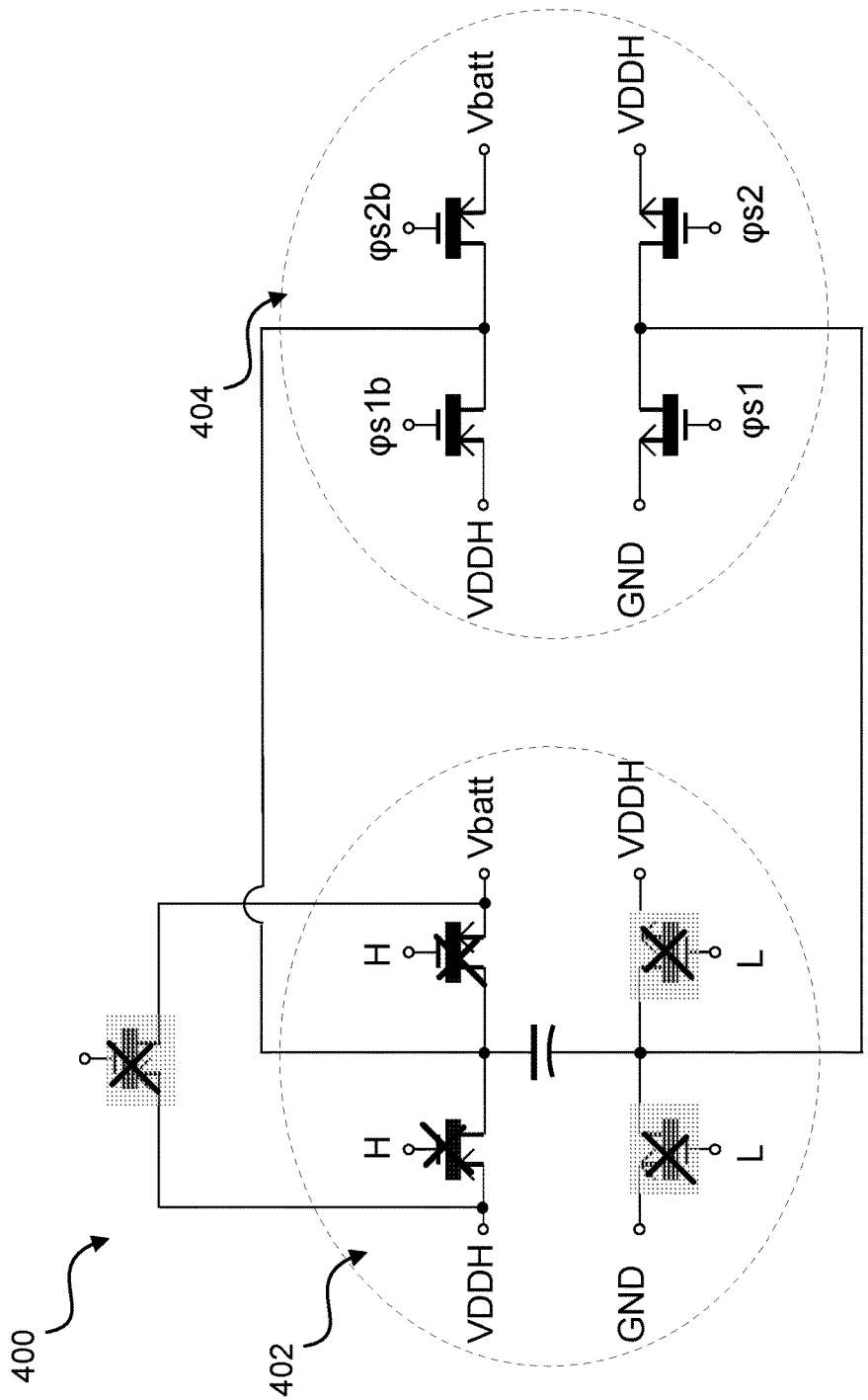
FIG. 4 shows another illustrative system for a reconfigurable DC-DC converter.

Turning now to FIG. 4, which shows another embodiment of a system 400 for a reconfigurable DC-DC converter. In the embodiment shown in FIG. 4, each of the switches comprises a MOSFET, e.g., a P-MOS or an N-MOS transistor. As shown in FIG. 4, the system 400 comprises a first switching circuit 402 and a second switching circuit 404. Further, as is shown in FIG. 4, the DC-DC converter is operating at a low-power mode. This is indicated by the switches in the first switching circuit 402, which are inactive, whereas the switches in the second switching circuit 404 are active. Further, in the embodiment shown, the switches to the left side of the switching circuit 404 are operated 180 degrees out of phase from the switches to the right side of the switching circuit 404.

Illustrative Methods for a Reconfigurable DC-DC Converter

Figure 5:
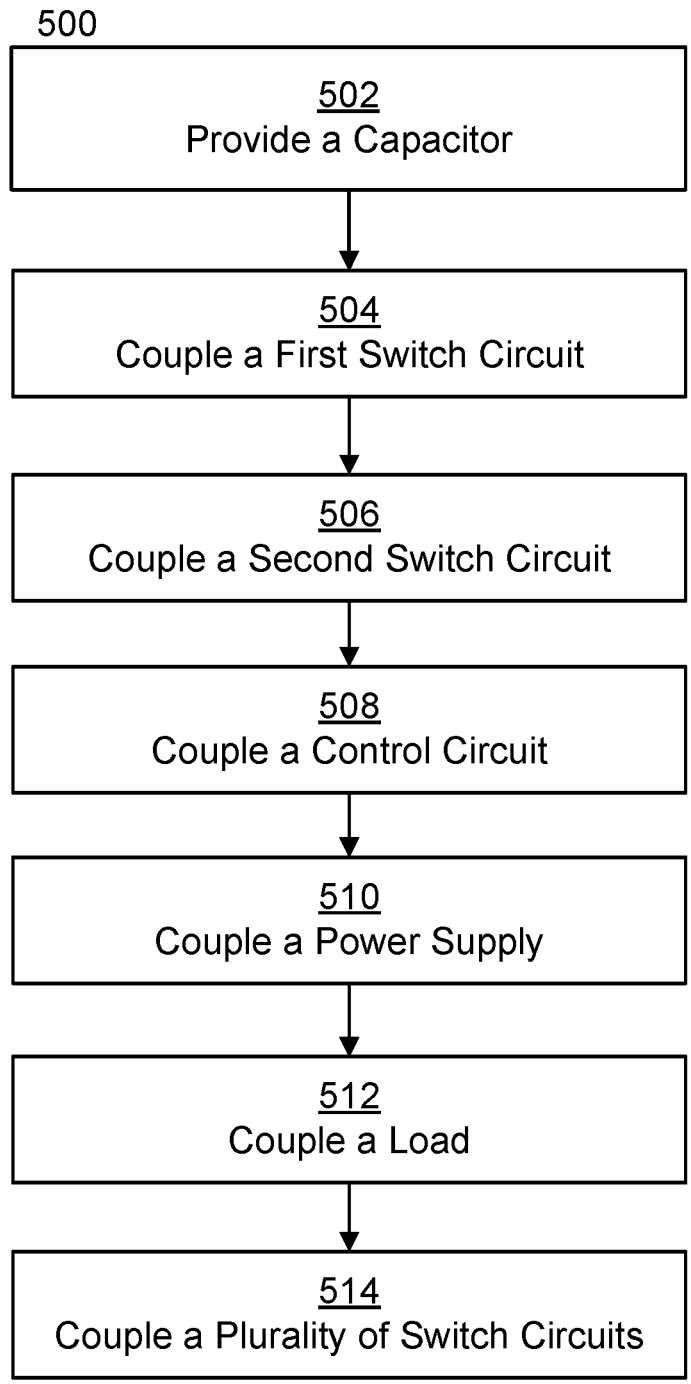
FIG. 5 shows a flow chart for an illustrative method of manufacture of a reconfigurable DC-DC converter according to an embodiment.

FIG. 5 shows a flow chart for an illustrative method of manufacture of a reconfigurable DC-DC converter according to an embodiment. In some embodiments, the steps in FIG. 5 may be performed in a different order. Alternatively, in some embodiments, one or more of the steps shown in FIG. 5 may be skipped, or additional steps not shown in FIG. 5 may be performed. The steps below are described with reference to components described above with regard to systems 100 and 150 shown in FIGS. 1A and 1B.

The method begins at step 502 when a capacitor 154 is provided. The capacitor 154 comprises one or more devices to store electric charge. For example, capacitor 154 may comprise one or more pairs of conductors separated by an insulator. Further, capacitor 154 may comprise a plurality of capacitors connected in parallel to increase total capacitance.

Next at step 504 a first switch circuit 152 is electrically coupled to the capacitor. The switch circuit 152 comprises an array of transistors electrically coupled to the capacitor 154, a power supply 102, and a load 106. The transistors may comprise, e.g., P-Channel MOSFETS (PMOS) or N-Channel MOSFETS (NMOS) transistors, which are oscillated by a clock signal provided by a controller circuit (e.g., control circuit 108 described above).

Then at step 506 a second switch circuit 156 is electrically coupled to the capacitor. Switch circuit 156 is comprises a switch circuit similar to switch circuit 154, however, in some embodiments switch circuit 156 comprises smaller transistors, e.g., transistors that are approximately half the size of the transistors in switch circuit 152. In some examples, the second switch circuit comprises a smaller number of transistors or other configuration of transistors at a predetermined ratio to the number/capacity/size of the transistors of the first switch circuit.

Next at step 508 a control circuit 108 is electrically coupled to the switch circuits 152 and 156. The control circuit 108 is configured to determine a power range or level (e.g., a voltage and/or current range or value) to provide to load 106. Based on this determination, the control circuit 108 may operate one or more switching circuits at various frequencies to provide power to the load 106. Control circuit 108 may include without limitation one or more general-purpose processors, one or more special-purpose processors (such as digital signal processing (DSP) chips, graphics acceleration processors, application specific integrated circuits (ASICs), and/or the like), and/or other processing structures or means, which can be configured to perform one or more of the methods described herein.

Then at step 510 a power supply 102 is electrically coupled to the switch circuits 152 and 156. Power supply 102 comprises a current and/or voltage source such as a battery.

Next at step 512 a load 106 is electrically coupled to the switch circuits 152 and 156. Load 106 comprises a circuit that requires voltage and current to operate. One example load comprises a Bluetooth interface.

Then at step 514 a plurality of switch circuits 152 and 154 are electrically coupled to the power supply 102, load 106, and capacitor 154. These switching circuits may comprise a plurality of interleaved switching circuits, each operating as described above and at the same frequency but at a phase difference to reduce the voltage ripple. Further, in some embodiments, each of the plurality of switching circuits may be identical.

Figure 6:
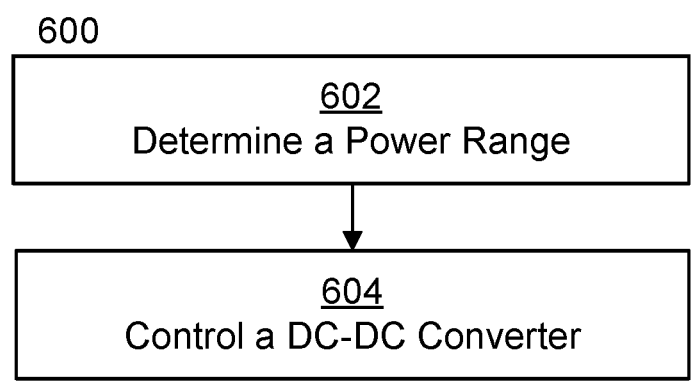
FIG. 6 shows a flow chart for an illustrative method of use of a reconfigurable DC-DC converter according to one embodiment.

FIG. 6 shows a flow chart for an illustrative method of use of a reconfigurable DC-DC Converter according to an embodiment. In some embodiments, the steps in FIG. 6 may be performed in a different order. Alternatively, in some embodiments, one or more of the steps shown in FIG. 6 may be skipped, or additional steps not shown in FIG. 6 may be performed. The steps below are described with reference to components described above with regard to systems 100 and 150 shown in FIGS. 1A and 1B.

The method 600 begins at step 602 when the control circuit 108 determines a power range. In some embodiments the power range may comprise a power level or a range of power levels required by the load 106. Further, the control circuit 108 may comprise a processor configured to control the load and also able to determine the power required by various operating modes, e.g., a transmit data mode may require a greater amount of power than a standby mode based on one or more power configuration settings.

Next at step 604 the control circuit 108 controls a DC-DC converter 104. In some embodiments, the control circuit 108 may control the DC-DC converter to provide the power determined at step 602. Further, the control circuit 108 may activate one or more switching circuits at a certain frequency to provide the required power. For example, in some embodiments, a control circuit 108 may control the DC-DC converter to operate at one of the modes described above with regard to FIG. 2.

Advantages of a Reconfigurable DC-DC Converter

There are numerous advantages of a reconfigurable DC-DC converter. For example, embodiments disclosed herein may enable a feedforward DC-DC converter that is able to determine the appropriate power level or range of power levels, then provide that power to a load, rather than operating as a feedback system. This reduces energy loss and provides a more controllable system. Further, embodiments disclosed herein may use a single capacitor rather than multiple capacitors, reducing the total size of the circuit. Further, embodiments disclosed herein do not require use of an inductor or other larger components, thus further reducing the total size of the circuit. This may reduce circuit size and cost because capacitors can be integrated on silicon into an integrated circuit.

Embodiments of the present disclosure provide a controllable DC-DC converter that can be configured to operate in different modes to efficiently provide a power level or range of power levels to the load in each of these modes. Designs of the present disclosure improve efficiency because the DC-DC converter can be operated in different modes that each have a different output power. This output power can match the supply power required by a load (e.g., a Bluetooth Low Energy interface) at various operational settings (e.g., transmitting, receiving, standby, etc.). This system is further more efficient because it is feedforward rather than feedback, and thus can adjust to the desired mode of operation. Designs are also more efficient because a single capacitor may be used, thus reducing the number of total components and therefore the overall size, complexity, and cost of the circuit.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. Processors used to implement methods described herein may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

The invention claimed is:

1. A system comprising:
   a first switch circuit electrically coupled in parallel to a capacitor;

a second switch circuit electrically coupled in parallel to the capacitor; and a control circuit electrically coupled to the first switch circuit and the second switch circuit, the control circuit configured to convert an input voltage to an output voltage at a desired current range by switching the first switch circuit at a first frequency or switching the second switch circuit at a second frequency, wherein in a first mode of operation the first switch circuit is operated at the first frequency and the second switch circuit is off and in a second mode of operation the first switch circuit is operated at the second frequency and the second switch circuit is off.

2. The system of claim 1, wherein the first switch circuit has a lower resistance when conducting than the second switch circuit.

3. The system of claim 1, wherein the first frequency and the second frequency are different frequencies.

4. The system of claim 1, wherein the control circuit comprises an oscillator configured to provide a first clock signal to the first switch circuit or a second clock signal to the second switch circuit.

5. The system of claim 4, wherein the first clock signal has a higher frequency than the second clock signal.

6. The system of claim 1, wherein in a third mode of operation the first switch circuit is off and the second switch circuit is operated at the second frequency.

7. The system of claim 6, wherein in a fourth mode of operation the capacitor is electrically coupled to a power supply and a load and the first switch circuit and second switch circuit are off.

8. The system of claim 1, further comprising a load electrically coupled to the capacitor, the first switch circuit, and the second switch circuit, and wherein the load comprises a Bluetooth Low Energy (BLE) circuit.

9. The system of claim 1, further comprising a plurality of first switch circuits and a plurality of second switch circuits.

10. The system of claim 9, wherein the control circuit is configured to reduce a voltage ripple of the output voltage by providing a clock signal at a different phase to each of the plurality of first switch circuits and the plurality of second switch circuits.

11. A method comprising:
coupling a first switch circuit to a capacitor;
coupling a second switch circuit to the capacitor; and
coupling a control circuit to the first switch circuit and the second switch circuit, the control circuit configured to convert an input voltage to an output voltage at a desired current range by switching the first switch circuit at a first frequency or switching the second switch circuit at a second frequency, wherein in a first mode of operation the first switch circuit is operated at the first frequency and the second switch circuit is off and in a second mode of operation the first switch circuit is operated at the second frequency and the second switch circuit is off.

12. The method of claim 11, further comprising coupling a power supply to the capacitor, the first switch circuit, and the second switch circuit.

13. The method of claim 11, further comprising coupling a load to the capacitor, the first switch circuit, and the second switch circuit.

14. The method of claim 11, further comprising coupling a plurality of first switch circuits to the capacitor and coupling a plurality of second switch circuits to the capacitor.

15. A method comprising:
determining a power level required by a load; and
controlling a DC-DC converter to operate in a mode to provide the power level to the load, wherein the DC-DC converter comprises:
a first switch circuit electrically coupled to a capacitor;
a second switch circuit electrically coupled to the capacitor; and
a control circuit electrically coupled to the first switch circuit and the second switch circuit, the control circuit configured to convert an input voltage to an output voltage at a desired current range by switching the first switch circuit at a first frequency or switching the second switch circuit at a second frequency, wherein in a first mode of operation the first switch circuit is operated at the first frequency and the second switch circuit is off and in a second mode of operation the first switch circuit is operated at the second frequency and the second switch circuit is off.

16. The method of claim 15, wherein in a third mode of operation the first switch circuit is off and the second switch circuit is operated at a second frequency.

17. The method of claim 16, wherein in a fourth mode of operation the capacitor is electrically coupled to a power supply and a load and the first switch circuit and second switch circuit are off.

* * * * *